(12) United States Patent
Reese et al.

(10) Patent No.: US 6,430,162 B1
(45) Date of Patent: *Aug. 6, 2002

(54) AUTOMATIC ECHO CANCELLATION FOR AN INTEGRATED SERVICES DIGITAL NETWORK INTERFACE

(75) Inventors: Charles A. Reese, Harpers Ferry, WV (US); Barry Bielsker, Vienna, VA (US)

(73) Assignee: Tellabs Operations, Inc., Naperville, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/339,613

(22) Filed: Jun. 24, 1999

Related U.S. Application Data (63) Continuation of application No. 08/837,722, filed on Apr. 22, 1997, now Pat. No. 6,134,224, which is a continuation of application No. 08/317,797, filed on Oct. 4, 1994, now Pat. No. 5,631,958.

(51) Int. Cl.[7] .................. H04B 3/20; H04M 1/00
(52) U.S. Cl. .................. 370/286; 379/406.01
(58) Field of Search .................. 370/286, 287, 370/289, 252, 254, 264, 265, 268, 269, 270, 465, 493, 494, 495; 379/87, 88.04, 88.07, 88.08, 100.05, 158, 282, 93.01, 406.01, 406.03, 406.05, 406.06

(56) References Cited

U.S. PATENT DOCUMENTS

| | | | |
|---|---|---|---|
| 3,673,355 A | 6/1972 | LaMarche et al. | 370/287 |
| 3,769,466 A | 10/1973 | Von Pfeil et al. | 379/408 |
| 3,980,833 A | 9/1976 | Calcagno et al. | 370/383 |
| 4,352,962 A | 10/1982 | LaMothe | 379/343 |
| 4,469,916 A | 9/1984 | de Bergh et al. | 379/108.02 |
| 4,482,997 A | 11/1984 | Bobsin et al. | 370/263 |
| 4,658,420 A | 4/1987 | Fukishi et al. | 379/407 |

(List continued on next page.)

OTHER PUBLICATIONS

K. Tanzillo, "Echo is a Nagging Problem in Primary Rate Private Network", Communications News, Oct. 1992 (p. 49).
K. Tanzillo, "Answer to Echo Problem", Communications News, Apr. 1994.
"Echo Control in Today's Digital Networks", Steve Jolley, Coherent Feature Article, pp. 1,7–10 Iss. 2, AT&T 332–415–130.
"Functional Description", 2, 2–5, 2–6, 2–10 and 2–11, 1990 AT&T.
"255 T1 Echo Canceller Modules", Tellabs Technical Manual, 1992, pp. 1,11–15.
"Coherent Eases Lane Restrictions on the Information Superhighway", Coherent News Release, Mar. 2, 1994, two descriptive text pages, two advertising pages "Automatic Echo Cancellation for ISDN without Dedicated PRI Channels".

Primary Examiner—David Vincent
Assistant Examiner—Phirin Sam
(74) Attorney, Agent, or Firm—John B. Berryhill; Dann Dorfman Herrell & Skillman (57) ABSTRACT

An echo canceler is connected to an ISDN Primary Rate Interface. The echo canceler is provided with an activation processor for monitoring call control messages on the D-channel and for selectively enabling or disabling echo cancellation on any of the B-channels in response to information contained within the call control messages. In particular, the activation processor decides whether to enable cancellation depending upon the Information Transfer Capability and Protocol Identification fields of the Bearer Capability portion of a call SETUP message. Additionally, the Channel Identification field of the SETUP message is used to identify the B-channel or channels affected by the SETUP message. When a channel is released, the activation processor maintains enabled echo cancellation as the default condition of the released channel. Other signal processing functions can be controlled by the activation processor in a similar manner.

16 Claims, 4 Drawing Sheets

U.S. PATENT DOCUMENTS

| | | | |
|---|---|---|---|
| 4,736,364 A | 4/1988 | Basso et al. | 370/420 |
| 4,885,755 A | 12/1989 | Yoshida | 370/420 |
| 4,982,428 A | 1/1991 | Agazzi | 379/411 |
| 4,985,891 A * | 1/1991 | Fujiwara et al. | 370/524 |
| 4,991,169 A * | 2/1991 | Davis et al. | 370/463 |
| 4,996,704 A * | 2/1991 | Brunson | 379/88.19 |
| 5,014,305 A | 5/1991 | Rodgers et al. | 379/402 |
| 5,014,307 A | 5/1991 | Joffe et al. | 379/410 |
| 5,029,204 A | 7/1991 | Shenoi et al. | 379/407 |
| 5,062,108 A * | 10/1991 | Bales et al. | 370/467 |
| 5,117,418 A | 5/1992 | Chaffee | 370/289 |
| 5,123,009 A | 6/1992 | Winter | 370/287 |
| 5,131,032 A | 7/1992 | Esaki | 379/410 |
| 5,148,427 A | 9/1992 | Buttle | 370/291 |
| 5,153,875 A | 10/1992 | Takatori | 370/290 |
| 5,163,044 A | 11/1992 | Golden | 370/286 |
| 5,291,479 A * | 3/1994 | Vaziri et al. | 370/264 |
| 5,305,312 A * | 4/1994 | Fornek et al. | 370/264 |
| 5,319,640 A * | 6/1994 | Yamasaki et al. | 370/510 |
| 5,398,249 A * | 3/1995 | Chen et al. | 370/362 |
| 5,420,921 A | 5/1995 | Lähdemäki | 379/407 |
| 5,450,487 A | 9/1995 | Lähdemäki et al. | 379/410 |
| 5,483,530 A * | 1/1996 | Davis et al. | 370/465 |
| 5,513,183 A | 4/1996 | Kay et al. | 370/337 |
| 5,515,296 A * | 5/1996 | Agarwal | 709/204 |
| 5,521,963 A * | 5/1996 | Shrader et al. | 455/437 |
| 5,524,194 A * | 6/1996 | Chida et al. | 345/330 |
| 5,528,595 A | 6/1996 | Walsh et al. | 370/402 |
| 5,528,679 A * | 6/1996 | Taarud | 379/32.04 |
| 5,530,724 A | 6/1996 | Abrams et al. | 375/345 |
| 5,553,119 A | 9/1996 | MacAllister et al. | 379/207 |
| 5,640,195 A * | 6/1997 | Chida | 348/14.01 |
| 5,875,037 A * | 2/1999 | Murata et al. | 358/400 |

* cited by examiner

AUTOMATIC ECHO CANCELLATION FOR AN INTEGRATED SERVICES DIGITAL NETWORK INTERFACE

CROSS-REFERENCE TO RELATED APPLICATIONS

This is a continuation of U.S. application No. 08/837,722 filed Apr. 22, 1997, now U.S. Pat. No. 6,134,224, which is a continuation of U.S. application No. 08/317,797, filed Oct. 4, 1994, now U.S. Pat. No. 5,631,958, issued May 20, 1997.

FIELD OF THE INVENTION

The present invention relates to the selective application of a signal processing function in a telecommunication system. In particular, the invention relates to identifying the information content of a communicated signal within a telecommunication system, and applying a signal processing function to the signal depending upon the type of information contained in the signal.

BACKGROUND OF THE INVENTION

Many types of telecommunication systems have been developed to exchange different kinds of information between specialized terminal devices. For example, separate telecommunication systems are often used for exchanging voice, data or video signals. Rather than provide separate telecommunication systems for each of these services, the use of an Integrated Services Digital Network (ISDN) is gaining popularity among users who need flexible access to different types of communication services. Several standards and recommendations pertaining to ISDN have been developed in order to specify a uniform system for encoding, transmitting, and switching signals in a single network among various kinds of terminal devices. These standards and recommendations include BellCore TR41449, AT&T 5ESS Customer National ISDN PRI Specification, ANSI TI.607, CCITT Q.931, and BellCore Guideline SR-NWT-2343 for National ISDN PRI CRF.

An ISDN interface provides the user with access to a number of full duplex, time-division multiplexed (TDM) channels. One of these channels can be used for call control messages that pertain to the remaining channels. In the T1 Primary Rate Interface standard, for example, 24 full duplex channels are multiplexed onto a communication link between the customer premises and the ISDN. Twenty-three of the channels, designated B-channels, can be used for communication between terminal devices. Each full duplex channel provides a virtual "4-wire" connection between the terminal equipment using the channel. The 24th channel, designated the D-channel, can be used for call control signals pertaining to the transmission of information on the B-channels and to the status of connections established between terminal devices via the B-channels.

In the transmission of signals involving 2-wire loop devices, such as standard telephones, it is necessary to provide an interface device between the 2-wire loop device and a 4-wire full duplex transmission link. The interface device, or hybrid, separates the inbound and outbound signals, which are combined on the 2-wire loop, into separate send and receive paths on the 4-wire link. Because hybrids cannot provide absolute separation of the send and receive signals, some residual coupling between the send and receive signals remains. This coupling can be perceived by a telephone user as echo.

In order to eliminate echo, devices known as echo cancelers have been developed. Briefly, an echo canceler monitors the received signal, computes an expected echo signal on the basis of the received signal and the impulse response of the local loop, and then subtracts the expected echo signal from the transmitted signal. In digital transmission systems, the function of echo canceling is accomplished using digital signal processors which are programmed to manipulate the data encoded in the transmitted signal that represents an audio signal. Such echo cancelers function acceptably on voice communication calls, but it is undesirable to employ echo cancelers on data communication calls which rely upon unaltered transmission of digital signals.

Because it is desirable to employ echo cancellation on some calls and not on other calls, some users have arranged their ISDN interfaces so that echo cancellation is always applied to certain channels and never applied to other channels. Then, the use of each ISDN channel is restricted to the types of calls that are compatible with the predetermined presence or absence of echo canceling on the channel. This solution is inconvenient because it reduces one of the primary benefits of ISDN, i.e. the user's flexibility of access to ISDN channels. It would be desirable to provide a system in which echo canceling on each ISDN channel is automatically enabled or disabled depending upon the type of call being made on each channel.

SUMMARY OF THE INVENTION

According to one aspect of the present invention, echo cancellation is automatically enabled or disabled on ISDN channels in accordance with the information content of calls being conducted on the ISDN channels. An echo canceler is provided with an activation processor for monitoring call control messages on the D-channel, determining when a call is established on any of the B-channels, and then enabling or disabling echo cancellation on each B-channel depending upon whether the type of call requires echo cancellation.

According to another aspect of the invention, an echo canceler is provided with an activation processor for recognizing call control messages on the D-channel of an ISDN connection. Specifically, the activation processor determines when the D-channel signals indicate that calls are to be requested, initiated, or terminated on any of the associated B-channels. When a call is established on a B-channel, the activation processor signals to the echo canceler whether echo canceling is desired on that B-channel. Preferably, when a call is terminated, echo cancellation is re-enabled on the released channel so that activated echo cancellation is the default channel condition.

The activation processor buffers data received in each D-channel time slot of successive DS1 frames until a complete D-frame is received. Then, the processor extracts pertinent information from the buffered D-frame in order to determine whether activation or deactivation of echo cancellation on one or more B-channels is required. In order to selectively enable echo cancellation for calls having either a local origin or a remote origin, the activation processor separately monitors inbound and outbound D-channel transmissions.

In accordance with another aspect of the invention, a signal processing function is selectively performed upon a telecommunication signal in dependence upon the type of information being conveyed by the telecommunication signal. A signal processor is provided with a control apparatus for determining whether the telecommunication signal is being used to convey a voice or data signal. Then, a signal processing function is performed upon the signal depending upon whether it is a voice signal or a data signal.

BRIEF DESCRIPTION OF THE DRAWINGS

The foregoing summary, as well as the following Detailed Description will be better understood when read in conjunction with the attached drawings, wherein.

DETAILED DESCRIPTION OF THE INVENTION

Figures 1, 3:
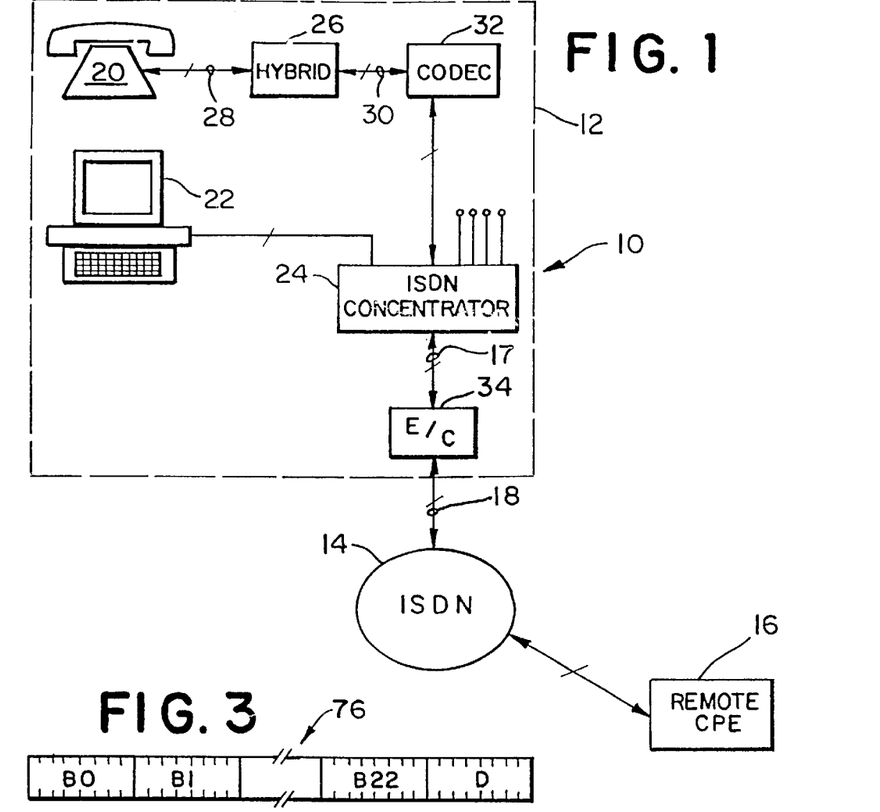
FIG. 1 is a functional block diagram of a telecommunications system having an ISDN and an echo canceler in accordance with the present invention.
FIG. 3 is a diagram of a bit transmission frame utilized within the telecommunications system of FIG. 1.

Referring now to FIG. 1 there is shown an telecommunication system 10. The telecommunication system 10 includes a local customer premises 12, an integrated services digital network (ISDN) 14, and a remote customer premises 16. The local customer premises 12 is connected to the ISDN 14 by a communication link 18. The communication link 18 is preferably a DS1 interface. In other embodiments, the interface to the local customer premise may be of the European CEPT standard, or other narrow or broad-band ISDN interfaces. The communication link 18 provides a plurality of communication channels between the customer premises 12 and the ISDN 14. For example, the DS1 narrow-band ISDN Primary Rate Interface provides 24 full-duplex 64 Kb/s time-division multiplexed channels.

One of the advantages of an ISDN is that a standard interface is provided for transferring information of many different types. For example, the terminal devices located at the local customer premises 12 may include telephones, such as a standard telephone 20, as well as data communication equipment, such as a data terminal 22. Other types of telecommunication terminal devices such as video conferencing devices, facsimile machines, audio modems, and the like, may also be located at the customer premises 12. In order to connect the customer premises equipment to the ISDN, an ISDN concentrator 24 is located at the customer premises. The ISDN concentrator 24 connects the customer premises equipment into a local communication network. The ISDN concentrator 24 may be embodied as a digital switching system, a private branch exchange system, or other equipment for appropriately multiplexing data from the local terminal devices into the ISDN channels according to the prevailing standard.

In order to connect a 2-wire analog telephone 20 with the ISDN concentrator 24, it is necessary to provide a hybrid 26 for connecting the 2-wire loop 28 with a 4-wire connection 30. Additionally, a CODEC 32 is required for digitizing transmitted voice signals from the telephone 20 and for converting received digital signals into analog form. The CODEC 32 may also provide additional voice coding functions, such as companding, as desired. The hybrid 26 and CODEC 32 may both be provided in the form of a line interface circuit that is located in the ISDN concentrator 24. In alternative embodiments, the ISDN concentrator 24 may be located "off site", such as in the central office of the local public telephone exchange, rather than at the customer premises.

Because the hybrid 26 cannot provide absolute separation of the transmitted and received signals, a portion of the received signal is coupled into the signal transmitted from the telephone 20. This coupling between the transmitted and received signals at the local customer premises 12 is perceptible by a remote telephone user as echo. Depending upon the round-trip signal transmission delay, and upon the attenuation between the remote customer premises and the local customer premises, echo can be a distinctly annoying phenomenon. In order to substantially eliminate echo, an echo canceler 34 is connected, via link 17, between the ISDN concentrator 24 and the communication link 18.

Figure 2:
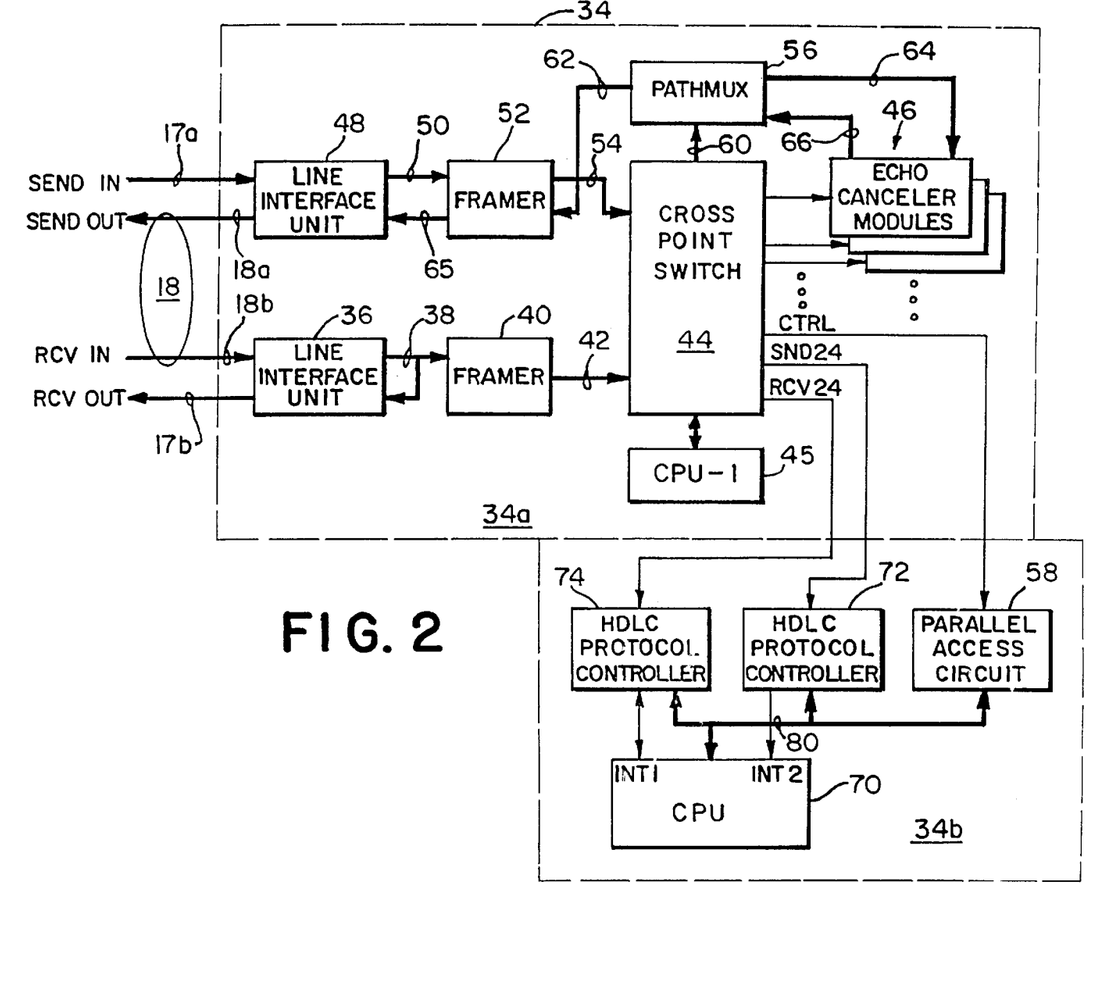
FIG. 2 is a functional block diagram of the echo canceler used within the telecommunications system of FIG. 1.

Referring now to FIG. 2, the echo canceler 34 is shown in block diagrammatic form. In the preferred embodiment, the echo canceler comprises an EC-6000 Digital Echo Canceler, manufactured by Coherent Communications Systems of Hauppauge, N.Y. External connections to the echo canceler 34 are made as follows. The link 17 between the echo canceler 34 and the ISDN concentrator 24 is connected to a SEND-IN terminal 17a for receiving outbound signals from the ISDN concentrator, and a RCV-OUT terminal 17b for transmitting inbound signals to the ISDN concentrator. The communication link 18 to the ISDN 14 connects to the echo canceler at a RCV-IN terminal 18b for receiving inbound signals from the ISDN 14, and at a SEND-OUT terminal 18a for transmitting outbound signals to the ISDN 14.

The echo canceler 34 includes an echo processing system 34a for substantially removing echo signals from the signals conducted within any of the channels along the SEND-OUT connection 18a. In accordance with the invention, the echo canceler 34 also includes an activation controller 34b for identifying the channel or channels to which echo cancellation is to be applied and for instructing the echo processing system 34a to activate or to de-activate echo cancellation in accordance with such a determination. In the preferred embodiment, the activation controller comprises an ASC6003A ISDN Disabler, manufactured by Coherent Communications Systems Corporation.

Operation of the echo processing system 34a proceeds generally as follows. Incoming TDM signals from the ISDN 14 are received from the RCV-IN terminal 18B by a line interface unit 36. Line interface unit 36 includes an appropriate connector and line receiver circuitry for receiving a 1.544 Mb/s DS1 line-coded signal from RCV-IN terminal 18B. The received signal passes through the line interface unit 36 and is provided, at terminal 38 to a framer circuit 40. The received signal at terminal 38 is also connected, via line interface unit 36, to the RCV-OUT terminal 17b for transmission of the received signal to the ISDN concentrator 24. In such a manner, the echo processing system 34 passes the received signal from the ISDN 14 directly to the ISDN concentrator 24.

The framer 40 receives the DS1 line-coded signal from the line interface unit 36 and converts the line-coded signal into a time-slot aligned logic signal that is compatible with digital processing circuitry. In a preferred embodiment, the framer 40 includes an MT8976 T1/ESF framer circuit manufactured by Mitel. The logic signals generated by the framer 40 are provided, via signal line 42, to a crosspoint switch 44.

The crosspoint switch 44 receives the logic-level version of the received DS1 signal from the framer 40 along signal line 42. The logical signal corresponding to each time slot within each DS1 transmission frame is routed by the crosspoint switch 44 to one of a plurality of echo canceler modules 46. Preferably, twenty-three canceler modules 46 are provided, so that there is one echo canceler module for each of the B-channels within a DS1 Primary Rate Interface. The logical signal corresponding to the 24th time slot within each received DS1 frame is routed by the crosspoint switch 44 to the activation controller at 34b via a signal line designated RCV 24. In a CEPT embodiment, thirty echo canceler modules are provided, and the D-channel time slot is routed to the activation controller. The crosspoint switch 44 comprises an MT8980D Digital Switch, manufactured by Mitel. The crosspoint switch 44 is operated under the control of a microprocessor 45.

Outbound TDM signals from the ISDN concentrator 24 to the ISDN 14 are received at SEND-IN terminal 17a and coupled to a line interface unit 48. From line interface unit 48, the SEND-IN signals are provided, via signal line 50, to framer 52. The framer 52 converts the received DS1 signals into appropriate logic-level signals, in a manner similar to that which has been described in connection with framer 40. Additionally, the framer 52 generates timing control signals to identify the time slot boundaries of the transmitted signal. The logic and timing control signals from framer 52 are provided, via signal line 54, to the crosspoint switch 44.

The crosspoint switch 44 is connected to a parallel access circuit 58 that is located within the activation controller at 34b. The parallel access circuit 58 includes a dual-port RAM in which there is encoded, for each B-channel of the SEND-IN signal, a control flag for indicating whether echo cancellation is to be applied to the corresponding B-channel. The parallel access circuit 58 preferably comprises an MT8920 ST-BUS Parallel Access Circuit, manufactured by Mitel.

The control flags within the memory of the parallel access circuit 58 are supplied to the crosspoint switch 44 in the form of a cyclical serial data stream that is routed to the CPU 45 via the crosspoint switch 44. The CPU 45 monitors the data stream from the parallel access circuit and, in turn, issues configuration control signals to a path multiplexer 56 in order to determine whether each SEND-IN time slot value is to be routed through one of echo canceler modules 46 or whether each SEND-IN time slot is to be routed directly into a SEND-OUT transmission frame. For each B-channel time slot of the SEND-IN signal, the crosspoint switch 44 provides the current logical value of the time slot from signal line 54, and the associated control flag from the CPU 45, to the path multiplexer 56, via signal line 60.

The path multiplexer 56 routes each received B-channel value to a corresponding one of echo canceler modules 46, via signal line 64. Within the corresponding echo canceler module, the present echo estimate is subtracted from the SEND-IN signal. The resulting processed signal is then provided, via signal line 66 to the path multiplexer 56. If echo cancellation is disabled on a given B-channel, the path multiplexer 56 responds to the control flag by routing each incoming value of the corresponding time slot from signal line 60 into a corresponding outbound time slot of a transmission frame on signal line 62.

Alternatively, if the control flag received from the CPU 45 indicates that echo cancellation is to be applied to a B-channel, the path multiplexer 56 obtains the processed signal from signal line 66 and multiplexes the processed signal into the appropriate time slot of the outbound transmission frame provided to signal line 62. Hence, the path multiplexer 56 selects either the unprocessed SEND-IN signal, or the processed signal from an echo canceler module, for placement into each outbound time slot on the basis of whether each corresponding channel is to be processed by an echo canceler module.

The outbound TDM signal is provided, via signal line 62, from the path multiplexer 56 to the framer 52. The framer 52 performs the appropriate line-coding of the outbound signals received from signal line 62. Then the framer 52 provides the line-coded signals, via signal line 65, to the line interface unit 48. From the line interface unit 48, the SEND-OUT signal is provided to the ISDN 14 along communication link 18.

In accordance with the foregoing description, echo cancellation is applied by the echo processing system 34a only to selected B-channels in accordance with a control flag or value, that has been set within the memory of parallel access circuit 58 within the activation controller 34b. Operation of the activation controller 34b proceeds as follows.

As has been discussed, the framer 40 provides each received transmission frame to the crosspoint switch 44 via signal line 42. The structure of a transmission frame is shown in FIG. 3. The transmission frame 76 comprises 24 eight-bit fields. The first twenty-three fields in the frame 76, labeled B0–B22, correspond to the 23 B-channels. The 24th octet, labeled D, contains the D-channel data. In addition to being available for the transmission of data between terminal devices, the D-channel can be used to carry user-network call control messages as defined in CCITT Recommendation Q.931. Recommendation Q.931 defines the contents of successive D-channel octets that can be used by ISDN compatible equipment to control access to the B-channels. Such access procedures are generally referred to as Link Access Procedures on the D-channel (LAPD). The basic signalling unit for LAPD is a group of successive D-channel octets delimited by a distinct bit pattern to form an LAPD frame. LAPD frames can be used by ISDN equipment for implementing call control procedures.

Figure 4:
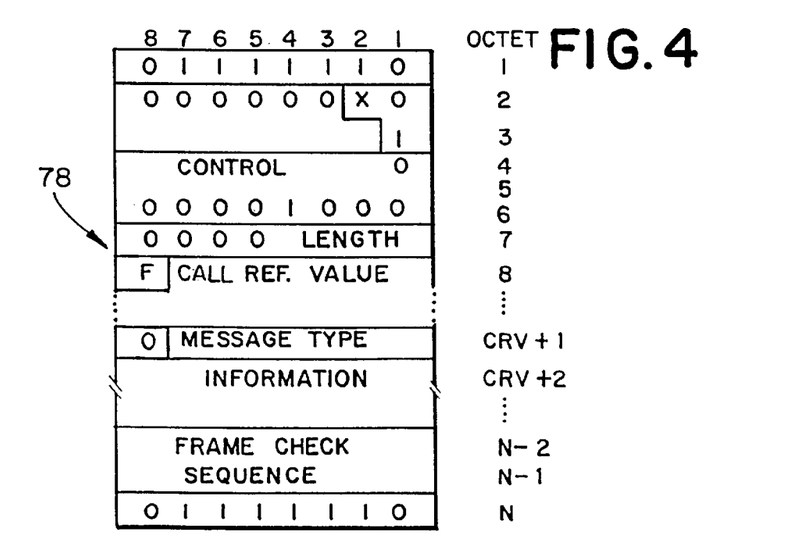
FIG. 4 is a diagram of a call control message frame employed within the telecommunications system of FIG. 1.

A representative LAPD frame 78 is shown in FIG. 4. Octets of the LAPD frame are transmitted within the D-channel time slots of successive ISDN transmission frames. The LAPD frame 78 comprises N octets. The first octet and the Nth octet are LAPD frame delimiters which identify the boundaries of the LAPD frame 78. Encoded within the LAPD frame are several data fields each comprising one or more octets. In accordance with LAPD standards, the contents of the data fields in an LAPD frame define the type of message represented by the LAPD frame as well as information pertaining to the message conveyed thereby.

For the purpose of determining when to enable or disable echo cancellation and for determining which channels require echo cancellation, it is only necessary to identify particular values of predetermined octets within an LAPD frame. First, it is necessary to determine whether the LAPD frame contains a call control message. Then it is necessary to determine the type of call control message within the LAPD frame. In the LAPD frame 78 of FIG. 4, certain octets are shown therein as containing examples of values that are significant to the operation of the activation controller 34b. The response of the activation controller to those values is described in greater detail hereinbelow. In the preferred embodiment, the call control messages of interest are SETUP, CONNECT-ACKNOWLEDGE, DISCONNECT, RELEASE, and RELEASE-COMPLETE. Additionally, it is desirable to identify the channel maintenance message, RESTART.

The SETUP message is issued within an ISDN whenever a terminal device requests a call to be established with another terminal device. In response to detecting a SETUP message, the activation controller extracts information about the requested call from the LAPD frame. In particular, the activation controller identifies the type of communication service that is to be provided to terminal equipment during the requested call. Additionally, the activation controller identifies the channel or channels to be used during the requested call. The extracted information is then stored for later use.

The CONNECT-ACKNOWLEDGE message is issued in an ISDN when a requested call is established between at least two terminal devices. In response to detecting a CONNECT-ACKNOWLEDGE message, the activation controller 34b retrieves the information that was stored in response to a previous SETUP message. On the basis of the retrieved information, the activation controller 34b then configures the echo canceler system 34a to enable or disable cancellation on the channel or channels upon which the call is being conducted.

In the preferred embodiment, the default cancellation status for each channel is to have cancellation enabled. The DISCONNECT, RELEASE, and RELEASE-COMPLETE messages are exchanged across each user-network interface at the conclusion of a call. The actions taken by the activation controller in response to a DISCONNECT, RELEASE, or RELEASE-COMPLETE message are identical in order to provide redundancy in returning to the default cancellation status. Therefore, in response to each of these messages that occur at or near the conclusion of a call, the activation controller enables cancellation in the indicated channel or channels.

Occasionally, a call will not be properly completed by the terminal equipment, for example, due to a malfunction of the terminal equipment. For this reason, some network devices have the ability to detect such incomplete calls and to free the affected channels by sending a RESTART message. The activation controller detects RESTART messages and returns the echo cancellation status of the affected channels to the default condition.

Referring again to FIG. 2, the crosspoint switch 44 is arranged to transmit each D-channel byte that is received from signal line 42 (derived from the RCV-IN signal) to a high level data link control (HDLC) protocol controller 74 via the signal line designated RCV24. Similarly, the crosspoint switch 44 is arranged to transmit each D-channel byte that is received from signal line 54 (and derived from the SEND-IN signal) to an HDLC protocol controller 72 via the signal line designated SND24.

The HDLC controllers 72 and 74 are similar in operation, and the HDLC controller 74 shall be described herein as representative. As each D-channel byte is received by the HDLC controller 74, the HDLC controller 74 arranges the received bytes into octets and determines whether the incoming octet corresponds to an LAPD frame delimiter. As each subsequent octet is received by the HDLC controller 74, the HDLC controller 74 stores the received octets in an internal buffer. The internal buffer of the HDLC controller 74 is preferably large enough to store 19 octets. If the HDLC buffer has stored 14 octets before receiving a D-frame delimiter, then the HDLC controller generates an interrupt which is sent to the CPU 70. When the CPU 70 acknowledges receipt of the interrupt, the HDLC controller 74 transmits the buffered octets onto bus 80. The HDLC controller 74 does not pass the octet value of delimiter octets to the CPU 70. Whenever the HDLC controller 74 detects the end of an LAPD frame, the HDLC controller 74 performs a validation test upon a frame check sequence that is embedded at the end of the LAPD frame. If the frame check sequence is valid, then the HDLC controller 74 generates an interrupt which is sent to the CPU, and then transmits any remaining buffered octets of the LAPD frame onto bus 80. Additionally, the HDLC controller 74 signals to the CPU that the end of a frame has been received. If the frame check sequence is not valid, the HDLC controller generates an interrupt to the CPU 70 along with a signal indicating that processing of the frame is to be aborted.

Figure 5:
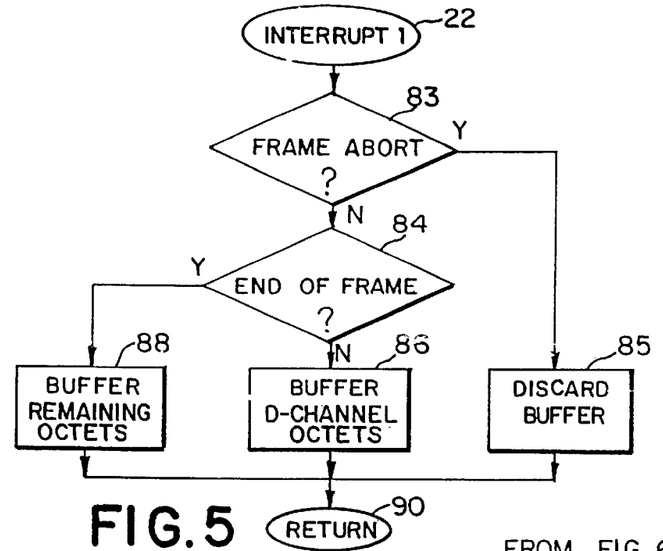
FIG. 5 is a logical flow diagram of a first procedure executed by the echo canceler of FIG. 2.

In response to interrupts received from the HDLC controller 74, the CPU 70 executes the general procedure shown in FIG. 5. Upon entry to the interrupt routine at step 82, the CPU 70 proceeds to step 83 wherein it is determined whether the interrupt was received as the result of a frame abort signal. If a frame abort signal has been received, the CPU 70 proceeds to step 85. If no frame abort signal has been received, then the CPU 70 proceeds to step 84.

In step 84, the CPU 70 determines whether an end of an LAPD frame has been detected by the HDLC controller 74. If, in step 84, it is determined that the end of an LAPD frame has not been detected, then the CPU 70 proceeds to step 86. If, in step 84, it is determined that the end of an LAPD frame has been received, then the CPU 70 proceeds to step 88.

In step 86, the CPU 70 obtains the buffered D-channel octets from the HDLC controller via bus 80. The buffered octets are then placed into an internal buffer of the CPU 70. Then, the CPU 70 proceeds to step 90 and returns from the interrupt routine. The CPU 70 maintains at least two such internal buffers for storing each of the respective LAPD frames received by the HDLC controller 74 and the HDLC controller 72. In the preferred embodiment, the CPU maintains several buffers so that incoming LAPD frames can continue to be buffered, in accordance with the interrupt procedure of FIG. 5, while the CPU processes the incoming LAPD frames in background. Rather than to perform any processing upon each set of octets as they are received from the bus 80, it is preferable to merely buffer each arriving group of octets and then to process the LAPD frame when a complete frame has been received. By buffering the incoming octets in an internal set of registers, the CPU 70 can process each LAPD frame with less computational overhead than by processing each incoming LAPD frame upon arrival. For example, each of the HDLC controllers 72 and 74 perform a validation procedure upon a frame check sequence encoded within each LAPD frame. If an HDLC controller detects an invalid frame check sequence, then the HDLC controller can notify the CPU 70 to simply discard the buffered frame or partial frame. In such an instance, any processing performed by the CPU 70 upon the previously-received LAPD octets of the invalid frame would have been a waste of time for the CPU 70. Additionally, by buffering the incoming LAPD frames, the CPU 70 does not need to keep pace with the arrival rate of LAPD frames during periods of heavy traffic. Of course, in alternative embodiments, the incoming D-channel octets can be processed as they arrive, if desired.

In step 85, any previously buffered octets of the incoming frame are discarded by the CPU 70 in response to the HDLC controller's determination that the frame check sequence is invalid. Then, the CPU 70 proceeds to step 90.

In step 88, the CPU 70 receives any remaining buffered LAPD octets from the HDLC controller and completes the storage thereof in an internal buffer. Then, the CPU 70 proceeds to step 90.

In step 90, the CPU 70 returns from the interrupt routine.

Figure 6A:
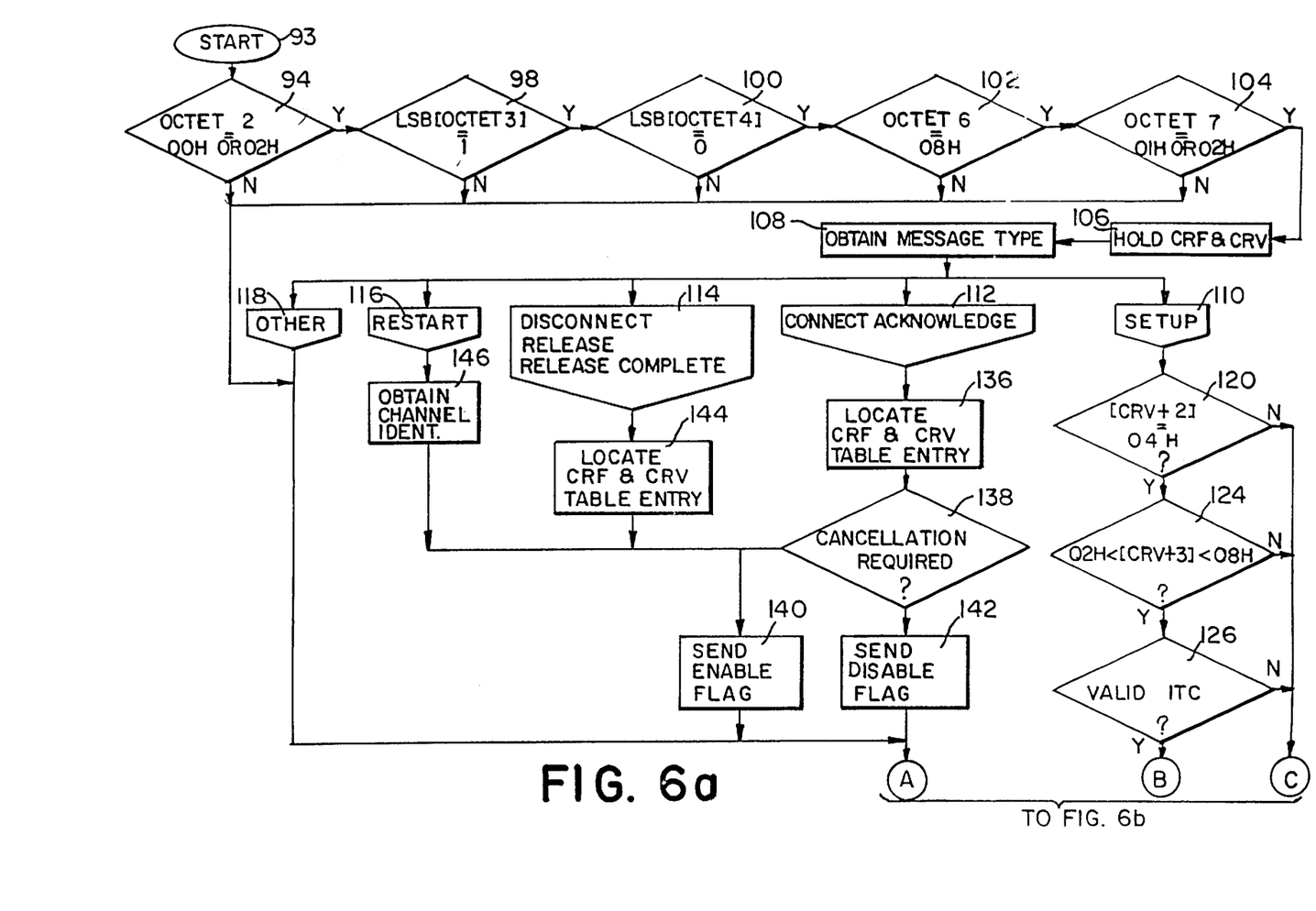
FIGS. 6a and 6b are a logical flow diagram of a second procedure executed by the echo canceler of FIG. 2 for processing call control messages of the type shown in FIG. 4.
Figure 6B:
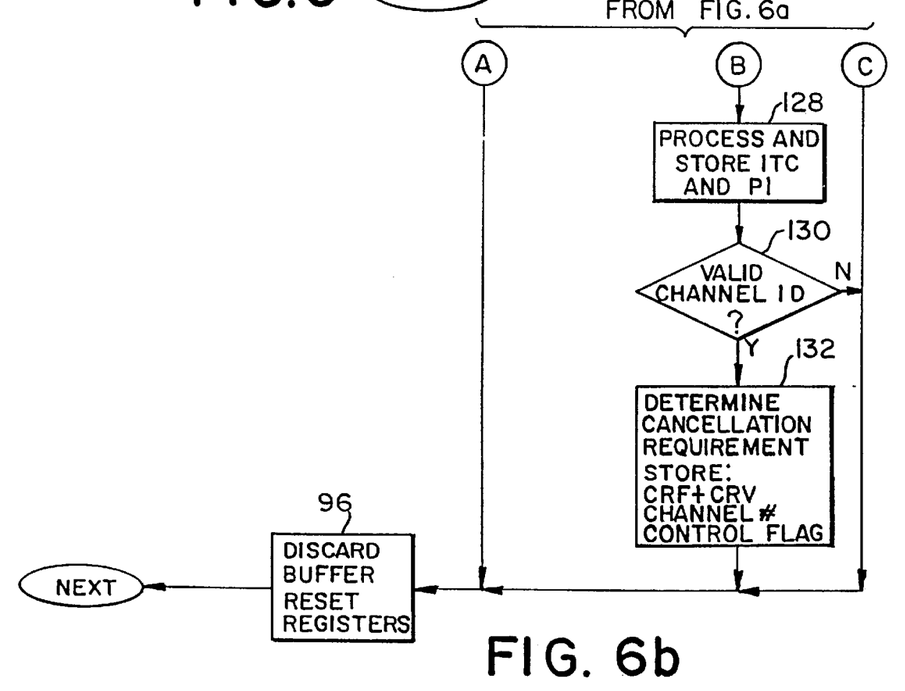

The sequence of steps that are performed by the CPU 70 to process the buffered LAPD frames is shown in FIGS. 6a and 6b. In general, the CPU 70 processes the LAPD frame by retrieving data from each octet of the LAPD frame in the sequence that the octets were received. In particular, the CPU 70 performs simple tests upon particular octets in order to make a rapid determination as to whether the LAPD frame contains any information relevant to echo cancellation. In this manner, an LAPD frame can be rapidly discarded if it is not relevant to the function of selecting activation or de-activation of echo cancellation. Such a rapid determination is desirable in order to maintain a processing speed that does not lag unacceptably behind the receipt of LAPD frames. In alternative embodiments, some of the qualification tests performed upon the LAPD frame can be omitted or altered as desired relative to the illustrative procedure described herein.

In step 93, the CPU 70 determines whether there are any buffered LAPD frames. If there are no buffered frames, the CPU 70 waits until one is placed into a buffer. If a buffered frame is present, then the CPU 70 proceeds to step 92.

In step 94, the CPU 70 retrieves the second octet of the LAPD frame from the buffer. Because the frame delimiter octets are not provided to the CPU 70 by the HDLC controller, the second octet of the frame will be the first octet in the buffer. If the LAPD frame contains a Q.931 call control message, the value of the second octet will be either 00H or 02H (wherein "H" indicates a hexadecimal value) as shown in FIG. 4. If the second octet contains neither of these values, then the CPU 70 proceeds to step 96 wherein the buffer is discarded. If, in step 94, the second octet contains the value 00H or 02H, then the CPU 70 proceeds to step 98.

In step 98, the CPU 70 retrieves the third octet of the LAPD frame. If the frame represents a Q.931 call control message, then the least significant bit of the octet will be asserted, as shown in FIG. 4. If the least significant bit of the third octet is not asserted, then the CPU 70 proceeds to step 96, wherein the buffer is discarded. If, in step 98, the least significant bit of the third octet is asserted, then the CPU 70 proceeds to step 100.

In step 100, the CPU 70 obtains the 4th octet of the LAPD frame. If the LAPD frame contains a Q.931 call control message, then the least significant bit of the 4th octet will be zero. If the least significant bit of the 4th octet is not zero, then the CPU 70 proceeds to step 96 wherein the buffer is discarded. Otherwise, the CPU 70 proceeds to step 102.

In step 102, the 5th octet of the LAPD frame is skipped, and the CPU 70 proceed to obtain the 6th octet of the LAPD frame. The 6th octet of the LAPD frame contains a unique code, which identifies the communication protocol of the message contained within the LAPD frame. For Q.931 call control messages, the value of the protocol discriminator should be 08H as shown in FIG. 4. If, in step 102, the 6th octet of the LAPD frame is not 08H, then the CPU 70 proceeds to step 96 and discards the buffer. Otherwise, the CPU 70 proceeds to step 104.

In step 104, the CPU 70 obtains the 7th octet of the D frame. The 7th octet of a Q.931 call control message contains the length of the Call Reference Value (CRV). The Call Reference Value is a one- or two-byte identification code that is assigned to each call. If, in step 104, the value of the 7th octet is other than 01H or 02H, then the CPU 70 proceeds to step 96 wherein the buffer is discarded. Otherwise, the CPU 70 proceeds to step 106.

In step 106, the CPU 70 obtains the one- or two-byte Call Reference Value in accordance with the call reference length obtained in step 104. The Call Reference Value is used by equipment in an ISDN to refer to an active call. The Call Reference Value is assigned at the beginning of a call and remains fixed until the call is termninated. The Call Reference Value is a local reference to an end-to-end connection involving two user-network interfaces. To eliminate the possibility that the same call reference value will be simultaneously assigned by the local user to an outbound call and by a remote user to a different inbound call, the high-order bit of the Call Reference Value contains a Call Reference Flag (CRF). The CRF is set at the user-network boundary to identify which end of the logical link originated the Call Reference Value. The origination side sets the Call Reference Flag to zero and the destination side sets the flag to unity. In this way, there cannot be a duplicate CRF and CRV across a user-network interface, even if a remotely originating call assigns the same Call Reference Value as a locally originating call. In step 106, the Call Reference Value, including the Call Reference Flag, is stored by the CPU 70 in a temporary register for later use if needed. Then, the CPU 70 proceeds to step 108.

In step 108, the CPU 70 obtains the first octet following the end of the Call Reference Value (octet CRV+1). For Q.931 call control messages, the CRV+1 octet will contain a code identifying the call control message type. In the preferred embodiment, the CPU 70 is programmed to identify and to respond to selected message types as follows. If the message type is a SETUP message, then the CPU 70 proceeds to step 110. If the message type is a CONNECT ACKNOWLEDGE message, then the CPU 70 proceeds to step 112. If the message type is a DISCONNECT, RELEASE, or RELEASE COMPLETE message, then the CPU 70 proceeds to step 114. If the message type is RESTART message, then the CPU 70 proceeds to step 116. If the message type is not one of the aforementioned predetermined message types, then the CPU 70 proceeds to step 118. From step 118, the CPU 70 proceeds to step 96 wherein the buffer is discarded.

In step 110, a SETUP message has been identified, and the CPU 70 proceeds to step 120. In a standard SETUP LAPD frame, the next information field after the SETUP code is the Bearer Capability field. The Bearer Capability field includes information pertaining to the type of call, e.g., voice or data, the data rate of the call, and the coding protocol used to encode the call. In step 120, the CPU 70 determines whether the next octet (CRV+2) is a Bearer Capability indication byte, which should have a value of 04H. If the CRV+2 octet contains a value of 04H, the CPU 70 proceeds to step 124. Otherwise, the CPU 70 proceeds to step 96 wherein the buffer is discarded.

In step 124, the CPU 70 obtains the CRV+3 octet. The CRV+3 octet indicates the number of octets within the Bearer Capability field. If the value of the CRV+3 octet is below 02H or above 08H, the CPU 70 proceeds to step 96 wherein the buffer is discarded. Otherwise, the bearer capability length is stored in a temporary buffer and the CPU 70 proceeds to step 126.

In step 126, the CPU 70 obtains the next octet of the bearer capability field (the CRV+4 octet). This octet should contain the Information Transfer Capability (ITC) code for the requested call. Bits 6 and 7 of this octet should both be 0 to indicate CCITT Standardized Information Transfer Capability Coding. The five least significant bits of the Information Transfer Capability should correspond to one of the ITC codes listed in Table 1. If the Information Transfer Capability code does not contain one of the CCITT Standardized Codes listed in Table 1, then the CPU 70 proceeds to step 96 wherein the buffer is discarded. Otherwise, the CPU 70 proceeds to step 128.

TABLE 1

Cancellation Requirements for Selected ITC and PI Values

| Information Transfer Capability | Protocol Identification | Type of Signal | Cancellation Required? |
|---|---|---|---|
| 00000 | n/a | Speech | Yes |
| 01000 | n/a | Data | No |
| 01001 | n/a | Data | No |
| 10000 | 00001 | 3.1 Khz Audio | No |
| 10000 | 00010 | 3.1 Khz Audio | Yes |

In step 128, any additional Bearer Capability fields, as indicated by the previously-stored Bearer Capability Length, are processed. In particular, the fifth octet of the Bearer Capability field, if present, is obtained by the CPU 70. The five least significant bits of the fifth octet of the Bearer Capability contains a Protocol Identification which will be used to determine whether echo cancellation is required in instances where the information transfer capability indicates a 3.1 kHz audio call is being made. If the Protocol Identifier is 00001, the 3.1 kHz signal is coded by a CCITT Rate Adaptation V.110/X.30 modem, and echo cancellation is not required. If the Protocol Identifier is 00010, then the audio signal has been coded by a $\mu$-law companding modem, and echo cancellation is required. When the end of the Bearer Capability field has been reached, the CPU 70 stores the ITC and the Protocol Identifier in a temporary register, and then proceeds to step 130.

In step 130, the CPU 70 obtains the octets of the Channel Identification field. The Channel Identification field ordinarily follows the Bearer Capability field of a SETUP message. The Channel Identification field identifies the channel, or channels, to which the SETUP message applies. The CPU 70 then determines whether the channel identification field contains properly formatted channel identification data. If the channel identification data is not valid, the CPU 70 proceeds to step 96 wherein the LAPD buffer is discarded and any temporary registers are cleared. If the channel identification is valid, then the CPU 70 obtains the channel number or numbers and proceeds to step 132.

In step 132, the CPU 70 determines, on the basis of the Information Transfer Capability, and the Protocol Identifier if any, whether echo cancellation is to be activated or de-activated on the identified channel or channels. The decision whether to activate or de-activate cancellation for a given call is made in accordance with Table 1. For standard speech signals, (Information Transfer Capability Code 00000) cancellation is to be enabled. Echo cancellation is also to be enabled for 3.1 kHz audio signals if the Protocol Identification code 00010 indicates that the channel is carrying $\mu$-law speech signals in accordance with CCITT recommendation G.711. For data calls, and for 3.1 kHz audio calls using the CCITT rate adaptation V.110/X.30 protocol, cancellation is to be disabled. If echo cancellation is required, the CPU 70 proceeds to step 140. The Call Reference Value, including the Call Reference Flag, is then stored as an entry of a look-up table maintained by the CPU 70. Additionally, the affected channel number, or numbers, is stored in association with the Call Reference Value. The last item of the table entry is a control flag which is set to indicate whether or not echo cancellation is to be applied to the affected channel or channels. This look-up table entry will be used in order to determine whether or not echo cancellation is to be activated upon receipt of a subsequent call control message containing the same Call Reference Value (including the Call Reference Flag). From step 132, the CPU 70 proceeds to step 96.

In step 112, an CONNECT ACKNOWLEDGE message has been identified, and the CPU 70 proceeds to step 136. In step 136, the CPU 70 attempts to match the Call Reference Value, including the Call Reference Flag, with the corresponding entry in the activation look-up table. If no matching entry is found in the table, then the CPU 70 proceeds to step 96. If a matching entry is found, then the CPU 70 retrieves, from the table, the control flag and the channel number or numbers. Then the CPU 70 proceeds to step 138.

In step 138, the CPU 70, having obtained the control flag indicating whether cancellation is to be applied to the selected channel or channels, proceeds to step 140 if echo cancellation is required. If echo cancellation is not required, the CPU 70 proceeds to step 142. In alternative embodiments, the determination, made in step 132, as to whether or not to apply cancellation can be deferred until step 138. In such an alternative embodiment, the table entry would include the Information Transfer Capability and the Protocol Identification, in place of the control flag, so that the determination could be made in step 138.

In step 140, the CPU 70 accesses the parallel access circuit 58, using bus 80, and writes an enable flag into the memory of parallel access circuit 58 at an address corresponding to the channel for which echo cancellation is to be enabled. If more than one channel number is identified in the retrieved activation look-up table entry, the CPU 70 will write an enable flag into the memory locations within the parallel access circuit 58 which corresponds to the affected channels. Then, the CPU proceeds to step 96. In step 142, the CPU performs a similar operation as has been described in connection with step 140, in order to enter a disable flag into one or more memory locations within the parallel access circuit corresponding to the affected channel or channels. Then, the CPU 70 proceeds to step 96.

In step 114, a DISCONNECT, RELEASE, or RELEASE COMPLETE message has been detected. Each of these messages is identified by the activation controller 34b as signifying the end of a call. In the preferred embodiment, the activation controller 34b recognizes each of these messages in order to provide redundant conditions for returning each channel to the desired default condition after a call has been completed. From step 114, the CPU 70 proceeds to step 144.

In step 144, the CPU 70 locates the activation table entry corresponding to the Call Reference Flag and Call Reference Value which were stored during step 106. If no matching table entry is found, then the CPU 70 proceeds to step 96. When a matching table entry is found in the activation look-up table, then the CPU 70 retrieves the channel number, or numbers, corresponding to the B-channel upon which the identified call has been completed. Then, the CPU 70 proceeds to step 140.

In step 116, a network maintenance message, the RESTART message, has been identified. A RESTART message can be issued by an ISDN functional device for releasing a B-channel in which a call has ended unsuccessfully, i.e., without issuing a DISCONNECT, RELEASE, or RELEASE COMPLETE message. From step 116, the CPU 70 proceeds to step 146.

In step 146, the CPU 70 obtains the channel identification from the LAPD frame buffer. In the case of a RESTART message, there is no need to consult the activation look-up table because the RESTART message is intended to identify a channel to be released rather than a call to be ended. After extracting the channel identification from the LAPD frame buffer, the CPU 70 proceeds to step 140 in order to re-enable echo cancellation on the specified channel or channels.

In step 96, the CPU 70 discards the LAPD buffer and resets any temporary storage registers that had been set during execution of previous steps. After step 96, the CPU 70 returns to step 93 to obtain and process the next LAPD frame buffer, if any.

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. In particular, there has been described herein an echo canceler having an associated activation controller for determining whether a telecommunication channel is being used for voice or data transmission, and for activating the echo canceler when the channel is being

What is claimed is:

1. A method of processing telecommunications signals on a digital communication link having a plurality of communication channels, comprising the steps of:

detecting a request message on a first channel of the link to establish a requested call to be conducted on a second channel of the link;

determining on the basis of information in the request message, and prior to establishment of the requested call, whether the requested call is to communicate digital information of a predetermined type designated for an audio signal processing function to be applied to signals communicated during the call;

applying said audio signal processing function to the signals communicated during the call;

storing an outcome of said determining step prior to establishing the requested call; and retrieving said outcome when the requested call is established to effect selective application of said audio signal processing function.

2. An echo canceler that provides echo cancellation for two-way communication channels that carry digitized signals on first and second transmission channels, echo signals on the second transmission channel, digital signals carried on the first transmission channel, the echo canceler comprising:

an input terminal for receiving the first and second transmission channels;

means for minimizing the magnitude of the echo signals on the second transmission channel;

means for monitoring digitized control information associated with the establishment of communications over the two-way communication channels;

means coupled to the monitoring means for determining a type of digitized information to be carried by the two-way communication channels, prior to the establishment of a call connection along either of the channels;

means, responsive to said determining means and coupled to said minimizing means, for automatically controlling whether said minimizing means minimizes echo signals on the two-way communication channels based on the type of digitized information determined to be carried on the respective two-way communication channels, whereby echo cancellation for each communication channel is automatically controlled based on the type of digitized information to be carried by each communication channel; and an output terminal for transmitting the the first and second communication channel signals on which echo signals have been selectively minimized by the minimizing means.

3. The echo canceler according to claim 2, wherein said monitoring means monitors first control messages associated with the establishment of communications on said two-way communication channels, said first control messages containing a first data field which identifies the type of digitized information to be carried, said monitoring means reading said first data field and said determining means making a type determination based on the first data field.

4. The echo canceler according to claim 3, wherein said monitoring means comprises means for sensing an initial request message for the establishment of a communication channel, and means for sensing an acknowledgment message in response to the initial request message, the acknowledgment message indicating whether a communication channel will be allocated in response to the initial request message;

said controlling means automatically controlling whether said minimizing means minimizes echo signals on a two-way communication channel based on the type of digitized information determined to be carried and, based on whether a corresponding acknowledgment message has indicated that a corresponding communication channel will be allocated.

5. The echo canceler according to claim 2, wherein said controlling means comprises means for generating control signals based on the type of digitized information determined to be carried on said two-way communication channels and transmitting said control signals to the minimizing means, said minimizing means comprising means responsive to the control signals for enabling and disabling the cancellation of echo signals based on the control signals.

6. The echo canceler according to claim 5, wherein the digitized signals are carried in packets, the monitoring means monitoring the first control messages which are also carried in packets.

7. In an echo canceler that provides echo cancellation for two-way communication channels that carry digitized signals on first and second transmission channels, echo signals on the second transmission channel being an undesired replica of digital signals carried on the first transmission channel, a method comprising the steps of:

receiving the two-way communication channels at an input terminal;

monitoring digitized control information associated with the establishment of communications over the two-way communication channels, prior to the establishment of call connections along each of the channels;

determining, based on the control information monitored, a type of digitized information to be carried on the two-way communication channels during a subsequent call connection to be made after receipt of the digitized control information;

automatically controlling whether minimization of the echo signals will be enabled on each of the two-way communication channels based on the type of digitized information ascertained by the determining step;

minimizing echo signals along a communication channel during a call connection made subsequent to receipt of the control information; and transmitting signals along said communications channels after said minimizing step.

8. The method according to claim 7, wherein said monitoring step monitors first control messages associated with the establishment of communications on said two-way communication channels, said first control messages containing a first data field which identifies the type of digitized information to be carried, said monitoring step reading said first data field and said determining step making a type determination based on the first data field.

9. The method according to claim 8, wherein said controlling step comprises the steps of generating control signals based on the type of digitized information determined to be carried on said two-way communication channels, said minimizing step selectably minimizing cancellation of echo signals based on the control signals.

10. The method according to claim 9 wherein the digital signals are carried in transmission frames, the monitoring step monitoring the first control messages which are also carried in transmission frames.

11. The method according to claim 8, wherein the monitoring step further comprises the steps of sensing an initial request message for the establishment of a control channel and sensing an acknowledgment message in response to the initial request message, the acknowledgment message indicating whether a communication channel will be allocated in response to the initial request message;

the controlling step controlling whether the echo signals will be minimized on a two-way communication channel based on the type of digitized information determined and based on whether a corresponding acknowledgment message has indicated a communication channel will be allocated.

12. An echo canceler that provides echo cancellation for two-way communication channels that carry digitized signals on first and second transmission channels, echo signals on the second transmission channel being an undesired replica of digital signals carried on the first transmission channel, the echo canceler comprising:

a canceling circuit that selectably minimizes the magnitude of the echo signals on the second channel;

a controller coupled to the canceling circuit, the controller comprising:

a monitor that monitors digitized control information associated with the establishment of communications over the two-way communication channels, prior to call connections being established over the two-way communication channels;

a decoder coupled to the monitor for determining a type of digitized information to be carried on the two-way communication channels;

the controller, responsive to said decoder, automatically controlling whether said canceling circuit subsequently minimizes echo signals on each of the two-way communication channels based on the type of digitized information determined to be carried on the respective two-way communication channels prior to connection of a call, whereby echo cancellation is automatically controlled based on the type of digitized information to be carried by each channel, and whereby such control is effective simultaneously with connection of a call.

13. The echo canceler according to claim 12 wherein the controller further comprises means for sensing an initial request message for the establishment of a communication channel, and means for sensing an acknowledgment message in response to the initial request message, the acknowledgment message indicating whether a communication channel will be allocated in response to the initial request message;

the controller automatically controlling whether the canceling circuit minimizes echo signals on a two-way communication channel based on the type of digitized information determined and based on whether the corresponding acknowledgment message indicated a communication channel will be allocated.

14. The echo canceler according to claim 12 wherein said monitor monitors first control messages associated with the establishment of communications on said two-way communication channels, said first control messages containing a first data field which identifies the type of digitized information to be carried, said decoder reading said first data field and determining a type determination based on the first data field.

15. The echo canceler according to claim 12 wherein said controller generates control signals based on the type of digitized information determined to be carried on said two-way communication channels and transmits said control signals to the canceling circuit which responds to the control signals by selecting whether or not to minimize cancellation of echo signals on a per channel basis based on the control signals.

16. The echo canceler according to claim 12 wherein the digitized signals are carried in transmission frames, and the monitoring means monitors the first control messages which are also carried in transmission frames.

* * * * *